United States Patent
Thomason et al.

(10) Patent No.: US 10,026,111 B2
(45) Date of Patent: Jul. 17, 2018

(54) COMPUTER SYSTEMS AND A RELATED METHOD FOR ENABLING A PROSPECTIVE BUYER TO BROWSE A VENDOR'S WEBSITE TO PURCHASE GOODS OR SERVICES

(71) Applicant: KONINKLIJKE PHILIPS N.V., Eindhoven (NL)

(72) Inventors: Graham Gordon Thomason, RedHill (GB); Stephen Townsend, East Grinstead (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 656 days.

(21) Appl. No.: 14/061,799

(22) Filed: Oct. 24, 2013

(65) Prior Publication Data

US 2014/0046797 A1    Feb. 13, 2014

Related U.S. Application Data

(63) Continuation of application No. 10/507,772, filed as application No. PCT/IB03/00421 on Feb. 6, 2003.

(30) Foreign Application Priority Data

Mar. 20, 2002    (GB) .................................. 0206552.2

(51) Int. Cl.
  *G06Q 30/00*    (2012.01)
  *G06Q 30/06*    (2012.01)
  (Continued)

(52) U.S. Cl.
  CPC ......... *G06Q 30/0613* (2013.01); *G06Q 30/02* (2013.01); *G06Q 30/0641* (2013.01)

(58) Field of Classification Search
  USPC .................................................. 705/26, 26.1
  See application file for complete search history.

(56) References Cited

U.S. PATENT DOCUMENTS 5,592,378 A * 1/1997 Cameron ............. G06Q 10/087
                                                  705/26.62
5,890,137 A    3/1999 Koreeda
(Continued)

FOREIGN PATENT DOCUMENTS

| CA | 2351742 A1 * | 12/2001 |
| CN | 1313567 A    | 9/2001 |

(Continued)

OTHER PUBLICATIONS

Hauser et al, "Generic Extensions of WWW Browser", Proceedings of the First USENIX Workshop on Electronic Commerce, 1995, 9 Pages.

(Continued)

*Primary Examiner* — Ashford S Hayles

(57) ABSTRACT

Buyer, vendor and third party computer systems are disclosed together with a related method for enabling a prospective Buyer to browse a Vendor's website purchase goods or services. The Buyer's computer system automatically extracts purchase information from which the Vendor can identify the Buyer's purchase. The Buyer's computer system may transmit, under control of the Buyer, confirmation to the Vendor that a third party has been instructed to pay the Vendor for the Buyer's purchase. A third party's computer system may transmit to the Vendor confirmation of receipt of an instruction from a Buyer to pay a Vendor for goods or services.

28 Claims, 2 Drawing Sheets

(51) Int. Cl.
*G06Q 30/02* (2012.01)
*H04L 9/32* (2006.01)

(56) References Cited

U.S. PATENT DOCUMENTS

| | | | |
|---|---|---|---|
| 5,974,549 A * | 10/1999 | Golan | G06F 9/468 |
| | | | 714/47.3 |
| 6,058,237 A | 5/2000 | Kim et al. | |
| 6,072,870 A | 6/2000 | Nguyen et al. | |
| 6,098,053 A | 8/2000 | Slater | |
| 6,101,482 A | 8/2000 | Diangelo et al. | |
| 6,173,272 B1 * | 1/2001 | Thomas | G06Q 20/00 |
| | | | 705/42 |
| 6,427,132 B1 | 7/2002 | Bowman-Amauh | |
| 6,463,534 B1 | 10/2002 | Geiger et al. | |
| 6,483,523 B1 * | 11/2002 | Feng | G06F 9/4443 |
| | | | 707/E17.116 |
| 6,535,880 B1 * | 3/2003 | Musgrove | G06Q 30/0603 |
| | | | 705/26.43 |
| 6,556,976 B1 | 4/2003 | Callen | |
| 6,601,047 B2 * | 7/2003 | Wang | G06Q 20/04 |
| | | | 705/27.1 |
| 6,879,665 B1 | 4/2005 | Cook et al. | |
| 6,879,965 B2 | 4/2005 | Fung et al. | |
| 6,938,019 B1 | 8/2005 | Uzo | |
| 6,944,660 B2 * | 9/2005 | Eshghi | H04L 29/06 |
| | | | 709/224 |
| 7,006,986 B1 | 2/2006 | Sines et al. | |
| 7,013,290 B2 | 3/2006 | Ananian | |
| 7,089,208 B1 | 8/2006 | Levchin et al. | |
| 7,165,041 B1 | 1/2007 | Guheen et al. | |
| 7,181,017 B1 | 2/2007 | Nagel et al. | |
| 7,225,155 B1 | 5/2007 | Polk | |
| 7,249,094 B2 | 7/2007 | Levchin et al. | |
| 7,295,989 B2 | 11/2007 | Rudnick | |
| 7,334,184 B1 * | 2/2008 | Simons | G06F 17/30867 |
| | | | 715/234 |
| 7,343,625 B1 * | 3/2008 | Zaidi | G06F 17/30899 |
| | | | 707/E17.119 |
| 7,370,014 B1 * | 5/2008 | Vasavada | G06Q 20/04 |
| | | | 705/35 |
| 7,542,924 B2 * | 6/2009 | Chow | G06Q 30/06 |
| | | | 705/26.7 |
| 7,574,376 B1 * | 8/2009 | Berman | G06Q 30/02 |
| | | | 705/26.41 |
| 7,752,095 B1 * | 7/2010 | Laracey | G06Q 40/00 |
| | | | 705/34 |
| 8,818,903 B2 * | 8/2014 | Dulin | G06F 21/33 |
| | | | 705/64 |
| 2001/0007098 A1 * | 7/2001 | Hinrichs | G06Q 30/02 |
| | | | 705/14.23 |
| 2001/0007099 A1 * | 7/2001 | Rau | G06O 30/02 |
| | | | 705/26.8 |
| 2001/0021917 A1 * | 9/2001 | Hatano | G06Q 30/06 |
| | | | 705/27.1 |
| 2001/0027420 A1 * | 10/2001 | Boublik | G06Q 30/06 |
| | | | 705/26.81 |
| 2001/0034724 A1 * | 10/2001 | Thieme | G06Q 20/02 |
| | | | 705/78 |
| 2001/0037253 A1 | 11/2001 | Kensey | |
| 2001/0044787 A1 * | 11/2001 | Shwartz | G06Q 20/00 |
| | | | 705/78 |
| 2001/0044896 A1 * | 11/2001 | Schwartz | G06F 21/31 |
| | | | 713/169 |
| 2002/0016754 A1 * | 2/2002 | Khan | G06Q 30/06 |
| | | | 705/35 |
| 2002/0016765 A1 * | 2/2002 | Sacks | G06O 20/02 |
| | | | 705/39 |
| 2002/0016769 A1 * | 2/2002 | Barbara | G06Q 20/04 |
| | | | 705/40 |
| 2002/0026446 A1 * | 2/2002 | Groos, III | G06F 17/30893 |
| 2002/0032663 A1 * | 3/2002 | Messner | G06Q 20/02 |
| | | | 705/72 |
| 2002/0038286 A1 * | 3/2002 | Koren | G06O 20/02 |
| | | | 705/40 |
| 2002/0046169 A1 | 4/2002 | Keresman et al. | |
| 2002/0052784 A1 | 5/2002 | Sherwin et al. | |
| 2002/0055909 A1 * | 5/2002 | Fung | G06Q 20/10 |
| | | | 705/42 |
| 2002/0065737 A1 * | 5/2002 | Aliabadi | G06Q 30/06 |
| | | | 705/26.64 |
| 2002/0069122 A1 | 6/2002 | Yun et al. | |
| 2002/0072942 A1 | 6/2002 | Kuykendall et al. | |
| 2002/0077918 A1 * | 6/2002 | Lerner | G06O 30/06 |
| | | | 705/26.41 |
| 2002/0077978 A1 * | 6/2002 | O'Leary | G06Q 20/04 |
| | | | 705/40 |
| 2002/0082929 A1 * | 6/2002 | Wang | G06Q 20/04 |
| | | | 705/27.1 |
| 2002/0087479 A1 * | 7/2002 | Malcolm | G06F 21/606 |
| | | | 705/64 |
| 2002/0143660 A1 * | 10/2002 | Himmel | G06Q 30/06 |
| | | | 705/26.8 |
| 2002/0154162 A1 * | 10/2002 | Bhatia | G06Q 30/06 |
| | | | 715/745 |
| 2002/0162027 A1 * | 10/2002 | Itwaru | G06Q 20/02 |
| | | | 726/15 |
| 2002/0188573 A1 | 12/2002 | Calhoon | |
| 2003/0061120 A1 * | 3/2003 | Shibuya | G06Q 20/10 |
| | | | 705/26.81 |
| 2003/0061170 A1 | 3/2003 | Uzo | |
| 2003/0093372 A1 * | 5/2003 | Atogi | G06Q 20/102 |
| | | | 705/40 |
| 2003/0097331 A1 | 5/2003 | Cohen | |
| 2003/0105681 A1 * | 6/2003 | Oddo | G06Q 30/02 |
| | | | 705/26.62 |
| 2003/0105710 A1 * | 6/2003 | Barbara | G06Q 20/04 |
| | | | 705/39 |
| 2003/0120554 A1 * | 6/2003 | Hogan | G06Q 20/02 |
| | | | 705/64 |
| 2003/0120608 A1 * | 6/2003 | Pereyra | G06Q 20/12 |
| | | | 705/64 |
| 2003/0182245 A1 | 9/2003 | Seo | |
| 2004/0054632 A1 * | 3/2004 | Remy | G06Q 20/04 |
| | | | 705/64 |
| 2004/0054715 A1 * | 3/2004 | Cesario | G06F 11/3414 |
| | | | 709/203 |
| 2004/0117321 A1 * | 6/2004 | Sancho | G06F 21/33 |
| | | | 705/76 |
| 2004/0148366 A1 * | 7/2004 | Ross, Jr. | G06Q 30/06 |
| | | | 709/218 |
| 2004/0186912 A1 * | 9/2004 | Harlow | G06Q 20/40 |
| | | | 709/237 |
| 2004/0205772 A1 * | 10/2004 | Uszok | H04L 29/06 |
| | | | 719/317 |
| 2005/0097008 A1 | 5/2005 | Ehring et al. | |
| 2005/0177438 A1 | 8/2005 | Thomason et al. | |
| 2007/0016473 A1 * | 1/2007 | Anderson | G06Q 30/02 |
| | | | 705/14.41 |
| 2008/0046337 A1 * | 2/2008 | Tarvydas | G06Q 30/06 |
| | | | 705/26.81 |
| 2008/0086403 A1 * | 4/2008 | Dilip | G06Q 20/10 |
| | | | 705/35 |
| 2011/0282711 A1 * | 11/2011 | Freishtat | G06Q 20/102 |
| | | | 705/7.29 |
| 2012/0046994 A1 * | 2/2012 | Reisman | G06Q 30/02 |
| | | | 705/7.29 |
| 2014/0006309 A1 * | 1/2014 | Reisman | G06Q 30/02 |
| | | | 705/347 |

FOREIGN PATENT DOCUMENTS

| | | |
|---|---|---|
| CN | 1332424 A | 1/2002 |
| JP | 9167185 A | 6/1997 |
| JP | 11167595 A | 6/1999 |
| JP | 11353382 A | 12/1999 |
| JP | 2000076336 A | 3/2000 |
| JP | 2001109742 A | 4/2001 |
| JP | 2001306853 A | 11/2001 |

(56) References Cited

FOREIGN PATENT DOCUMENTS

| | | | |
|---|---|---|---|
| JP | 2001351024 | A | 12/2001 |
| KR | 20000058839 | A | 10/2000 |
| TW | 469714 | B | 12/2001 |
| WO | 0022557 | A2 | 4/2000 |
| WO | 0070512 | A1 | 11/2000 |
| WO | 0111513 | A1 | 2/2001 |
| WO | 0178023 | A1 | 10/2001 |
| WO | 0208970 | | 1/2002 |
| WO | 0221366 | A1 | 3/2002 |

OTHER PUBLICATIONS

Herzbert et al, "Minipay: Charging Per Click on the Web", Computer Networks and ISDN Systems North Holland Publishing, Amsterdam, NL, vol. 29, No. 8-13, 1997, pp. 939-951.
Thierry, "Common Markup for Micropayment Per-Fee-Links", W3C Working Draft, Aug. 25, 1999, pp. 1-25, XP002258272.
Burstein, "An Implementation of Micromint", Master's Thesis, Massachusetts Institute of Technology May 22, 1998, pp. 1-46, XP002258273.
Sander et al, "Electronic Payment Put in Context: Bill Payment, Electronic Commerce and Exploitation of Electronic Products", Telematica Instite, Mar. 3, 2002, pp. 1-104

* cited by examiner

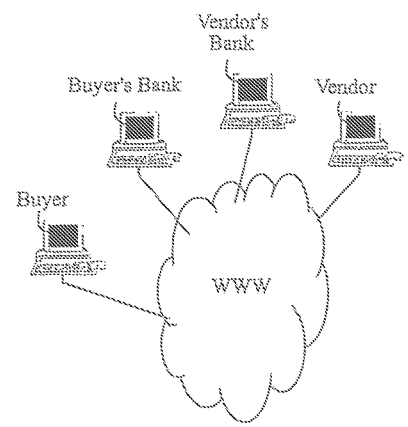
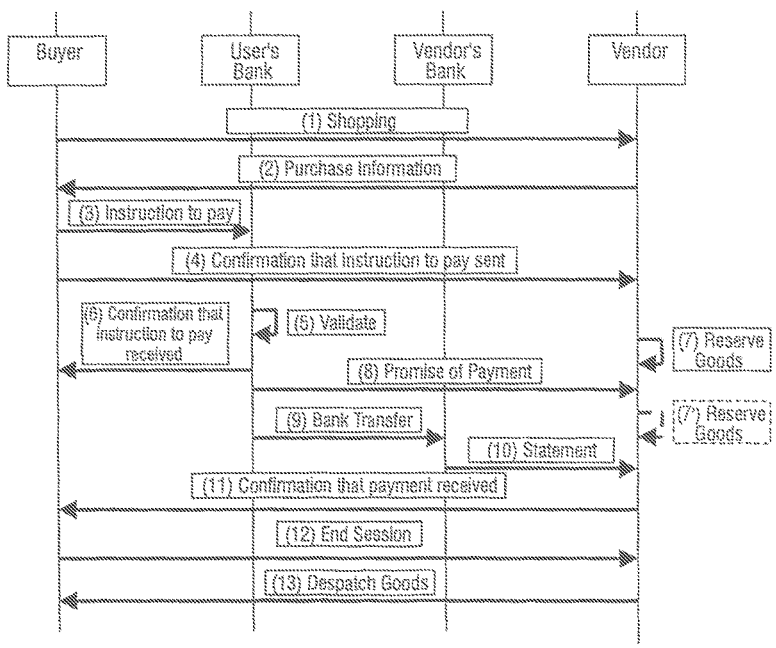

FIG.3

COMPUTER SYSTEMS AND A RELATED METHOD FOR ENABLING A PROSPECTIVE BUYER TO BROWSE A VENDOR'S WEBSITE TO PURCHASE GOODS OR SERVICES

This application claims the benefit or priority of and describes the relationships between the following applications: wherein this application is a continuation application of U.S. patent application Ser. No. 10/507,772, filed Sep. 15, 2004 which is the National Stage of International Application No. PCT/IB03/00421, filed Feb. 6, 2003, which claims the priority of foreign application GB 0206552.2 filed Mar. 20, 2002, each of which is incorporated herein by reference thereto.

This invention relates to computer systems and a related method for enabling a prospective Buyer to browse a vendor's website to purchase goods or services.

US patent application, publication number US2001/0034724 A1 (hereafter 724) discloses a system and related method of facilitating a secure financial transaction in which a financial institution of a buyer receives purchase data of a transaction from a transaction facilitator, which acts as an intermediary between the buyer and seller. Specifically, in activity A (see paragraphs 0013 and 0014 with reference to FIG. 1), the buyer having previously browsed a seller's website provides the transaction facilitator with the seller's name or the seller's website and selected product or general description of the item desired if a specific such item cannot be found. Thereafter, the financial institution receives a request for payment for the transaction from the buyer and processes the transaction on behalf of the buyer.

According to a first aspect of the present invention, a computer system is provided which is configured to perform the steps of supporting a browser to enable a Buyer to browse a Vendor's website in order to select goods or services for purchase; automatically extracting purchase information from the Vendor's website from which the Vendor can identify the Buyer's purchase such as a purchase price and/or a Vendor purchase reference; and transmitting, under the control of the Buyer, an instruction to a third party, such as a Bank with which the Buyer has an account, to pay the Vendor for the Buyer's purchase, wherein the instruction includes the purchase information.

The purchase information may further include banking information of the Vendor needed for the third party to effect payment although such information would not be needed if the vendor was previously known to the third party.

To facilitate extraction from the Vendor's website, the purchase information may be tagged as such on the Vendor's website.

Also, the automated extraction of purchase information and the transmission of the instruction to the third party may be done by program code not provided by the Vendor, for example, by program code provided by the trusted third party.

Also provided in accordance with the first aspect of the present invention is a computer system configured to perform the step if hosting a Vendor's website which enables Buyer to browse that website in order to select goods or services for purchase, wherein purchase information from which the Vendor can identify the Buyer's purchase is tagged as such on the Vendor's website to facilitate its automated extraction by the Buyer's browser.

According to a second aspect of the present invention, a computer system is provided which is configured to perform the steps of supporting a browser to enable a Buyer to browse a Vendor's website in order to elect goods or services for purchase; extracting purchase information from the Vendor's website from which the Vendor can identify the Buyer's purchase; under control of the Buyer and ideally as a result of a single action by the Buyer, transmitting an instruction to a third party to pay the Vendor for the Buyer's purchase, wherein the instruction includes the purchase information, and confirmation to the Vendor that the third party has been so instructed.

Also provided in accordance with a second aspect of the present invention is a computer system configured to perform the steps of hosting a Vendor's website which enables a Buyer to browse that website in order to select goods or services for purchase; and instigating an action with respect to the purchase, such as reserving for the Buyer the goods or services selected, upon receipt of confirmation from the Buyer that a third party has been instructed to pay the Vendor for the Buyer's purchase.

According to a third aspect of the present invention, a computer system is provided which is configured to perform upon receiving an instruction from a Buyer to pay a Vendor for goods or services information the steps of transmitting a confirmation of receipt of the instruction to the Vendor, which may constitute a contract between either the Buyer or the third party and the Vendor; and paying or instructing payment to the Vendor in accordance with purchase information included in the instruction from which the Vendor can identify the Buyer's selection.

Also provided in accordance with the third aspect of the present invention is a computer system configured to perform the step of hosting a Vendor's website which enables Buyer to browse that website in order to select goods or services for purchase; and instigating an action with respect to the purchase, such as reserving for the Buyer the goods or services selected, upon receipt of confirmation from a third party of that third party having received an instruction from the Buyer to pay the Vendor for the Buyer's purchase.

According to a four fourth aspect of the present invention, a method of enabling a Buyer to browse a Vendor's website in order to select goods or services for purchase is provided. In order, the method comprises the steps of initiating a session between the computer systems of a Buyer and the host of a Vendor's website to enable the Buyer to browse and select goods or services for purchase; at the Buyer's computer system, extracting purchase information from the Vendor's website from which the Vendor can identify the Buyer's purchase; at the Buyer's computer system, transmitting under the control of the Buyer, an instruction to the computer system of a third party to pay the Vendor for the Buyer's purchase, wherein the instruction includes the purchase information; at the third party's computer system and in accordance with purchase information, either (i) effecting payment or future payment to the Vendor or the Vendor's Bank or (ii) contracting to pay the Vendor or the Vendor's Bank; and terminating the session between the computer systems of the Buyer and the Vendor.

The present invention will now be described, by way of example only, with reference to the accompanying figures in which:

FIG. 1 depicts the computer systems of a Buyer, the Buyer's bank, a Vendor and the Vendor's Bank, each connected to the Internet;

FIG. 2 is a message sequence diagram illustrating the interaction between the computer systems of FIG. 1; and FIG. 3 is an illustration of a screen layout of the Buyer's computer system of FIG. 1.

The computer systems of a Buyer, the Buyer's Bank, a Vendor and the Vendor's Bank are each depicted in FIG. 1 connected to the Internet. Using the Buyer's computer system, the Buyer is able to browse the Vendor's website which is hosted on the Vendor's computer in order to purchase goods or services. FIG. 2 is a signal sequence diagram illustrating the interaction between the computer systems of FIG. 1 as follows:

Step (1) Shopping

Figure 3:
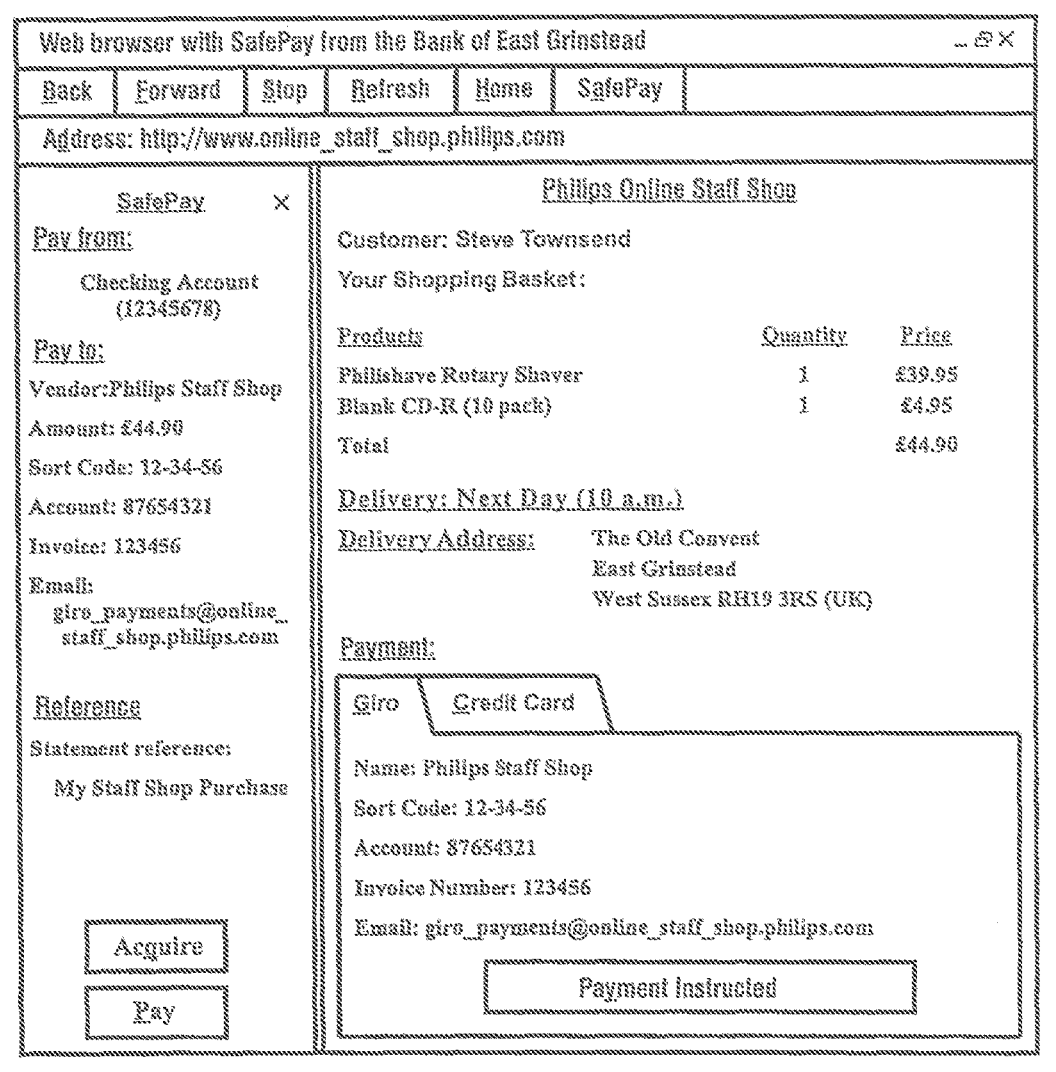

Using the Buyer's computer system, the Buyer browses the Vendor's website and selects good for purchase. For the purposes of describing the best mode of the invention, a fictitious scenario is hereafter portrayed in which of the Buyer is one of the co-inventors, the Vendor is the Philips Online Staff Shop which in reality does not exist and the Vendor's Bank is the Bank of East Grinstead which similarly does not exist. The Buyer uses browser modified by program code provided by the Bank. As shown in FIG. 3, the browser contains conventional browser elements including:

a title bar including minimise, maximise and close window controls, a tool bar with back, forward, stop, refresh and home commands, address bar in which an url of the website currently being accessed is displayed, and a browser window in which the Philips Online Staff Shop is being accessed and, in particular, the Buyer's virtual shopping basket in to which the Buyer has placed two Philip's products for purchase.

In addition, for the purpose of implementing the present invention, the browser has novel elements including:

a second window titled "Safepay" which provides the Buyer with an interface to trusted program code, provided by the Buyer's Bank, which co-operates with the browser (often termed a plug-in) and its operation is independent from information and program code (such as an Java applet) downloaded by the Buyer's browser from the Vendor's website. The SafePay window interface and trusted program code enables the Buyer to instruct the Buyer's Bank to pay the Vendor as will be described in more detail below, and an additional "SafePay" control on the title bar which toggles the appearance of the SafePay window.

Step (2) Purchase Information

Having selected goods for purchase and a mode of delivery and entered a delivery address, the Buyer is then required to pay for the goods. In the browser window, the Buyer is shown to have a choice between convention Internet based Credit Card payment and Giro transfer, that is a direct Bank account to Bank account transfer. Upon selecting the Giro tab, the Buyer is presented with purchase information which is tagged as such and which both the Buyer requires to pay the Vendor and the Vendor requires to relate such payment to the Buyer's purchase. The purchase information includes the name of the Vendor "Philips Staff Shop" the sort code "12-34-56" and account number "87654321" of the Vendors Bank, the Vendor's invoice number and the Vendor's email address.

Step (3) Instruction to Pay

As previously stated, the SafePay window provides the Buyer with an interface to trusted program code which enables the Buyer to instruct the Buyer's Bank to pay the Vendor. In order to transfer the purchase information, the Vendor clicks the Acquire button on the SafePay window whereupon the trusted program code scans the Browser window for tagged purchase information and automatically copies any such tagged purchase information to the SafePay window. The Buyer may also insert his own Statement reference with which to identify the debit from the Buyer's account.

To proceed with the purchase, the Buyer clicks the Pay button which instigates the creation of a message incorporating the tagged purchase information previously copied to the SafePay window, and transmission of that message to the Vendor's Bank.

Step (4) Confirmation that Instruction to Pay Sent

Having instructed the Buyer's Bank to pay the Vendor, the Buyer transmits to the Vendor confirmation of the instruction to the Bank to pay the Vendor being sent. This can done manually by the user clicking the Payment Instructed button on the Browser window or, if the button the tagged as such and the browser is so configured, arrange for a click on Pay to automatically instigated a click on Payment Instructed in the Browser Window. Upon receipt of confirmation, the vendor may update their website to reflect this (not shown).

Step (5) Validate Step (6) Confirmation to Buyer that Instruction to Pay Received Upon receiving the instruction to Pay, the Buyer's Bank will validate the Buyer's request, for example by analyzing digital signatures to ensure that the Buyer was indeed the sender and also by checking that sufficient funds are available in the Buyer's account. Confirmation that instruction to pay has been received and optionally validated is sent to the Buyer.

Step (7) Reserve Goods

Upon receiving confirmation from the Buyer's that the Buyer has instructed the Buyer's Bank to pay the Vendor, the Vendor reserves the goods for the Buyer.

Step (8) Confirmation to Buyer that Instruction to Pay Received

Prior to making the Bank transfer, the Buyer's Bank may confirm to the Vendor that the Buyer has instructed the Buyer's Bank to pay the Vendor. This confirmation may form a contractual obligation on the Buyer and/or Buyer's Bank to pay the Vendor. The confirmation includes purchase information which the Vendor requires the confirmation to the Buyer's purchase. In step (7), the Vendor reserves the goods for the Buyer only after confirmation from the Buyer's that the Buyer has instructed the Buyer's Bank to pay the Vendor, however, such reservation (step 7') may alternatively be made only after the Buyer's Bank has confirmed to the Vendor that the Buyer has instructed the Buyer's Bank to pay the Vendor.

Step (9) Bank Transfer

Using the purchase information, the Bayer's Bank transfers money to the Vendor's Bank and accompanying payment is purchase information which, once forwarded from the Vendor's Bank to the Vendor, enables the Vendor to relate the payment to the Buyer's purchase. As an alternative to payment, it is conceivable that an inter-Bank promise of money could be made whereby the Vendor's Bank can be confident of receiving the money at some time in the near future.

Step (10) Statement

The Vendor's Bank reports completion of the bank transfer (or promise thereof) from the Buyer's Bank to the Vendor.

Step (11) Despatch Goods & Step (13)

Upon receiving confirmation from the Vendor's Bank that the Vendors account has been credited by the Buyer, the Vendor confirms to the Buyer that payment has been received and dispatches the goods to the Buyer.

Step (12)

The Buyer terminates the session by logging of the vendor's website either informing the Vendor of the termination and the Buyer's browser being directed to say the Vendor's home page, or by unilateral termination say where the Vendor selects another website to browse.

In the above described example, the Vendor's website is hosted on a computer system of the vendor, however, it will be appreciated that a third party may host the vendor's website. Similarly, the computer systems of the Buyer's and Vendor's Banks could be owned and operated by a third party on the Banks, and in particular, where such a third party may operate on behalf of several banks.

Also, tagging data for extraction from a browser could be readily achieved by using conventional Extensible Mark-up Language (XML) or the like, XML being which is a universal format for structured documents and data on the Web. Alternatively, a dedicated tagging protocol could be formulated and adopted.

As an alternative to express tagging in the source, information on the Vendor's website could be tagged graphically, say by placing an icon or series of icons adjacent the information on the Vendor's website which is needed by the Buyer to pay the vendor and needed by the Vendor to match payment to the Buyer's purchase. If this were the case, extraction of the information would require scanning for such graphical tags.

Whilst the above embodiment describes the Buyer having a between convention Internet based Credit Card payment and Giro transfer using "Safe Pay", credit card payment could have been used in a method according to the present invention in which the third party is a credit card company instead or as well as a Bank and where the held by the Buyer is a credit card account.

The invention is described in the context of computers systems connected across the Internet, however, it will be appreciated that the invention will be equally applicable to other WANs, LANs or other type of network.

From reading the present disclosure, other modifications will be apparent to persons skilled in the art. Such modifications may involve other features which are already known in the design and use of computer systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization of one or more of those features which would be obvious to persons skilled in the art, whether or not it relates to the same invention as presently claimed in any claim and whether or not it mitigates any or all of the same technical problems as does the present invention. The applicants hereby give notice that new claims may be fomulated to such features and/or combinations of such features during the prosecution of the present application or of any further application derived therefrom.

The invention claimed is:

1. A computer system local to a Buyer, configured to perform acts of:

providing a browser modified by program code, the browser having a window interface and trusted program code to enable browsing a webpage of a remote Host computer of a Vendor's Website to render the webpage on a display local to the Buyer in order for the Buyer to select at least one of a good and service for purchase, the remote Host computer being remote from the local computer system and the Buyer;

scanning on the local computer system a currently displayed webpage;

automatically extracting from the currently displayed webpage on the local computer system and under control of the trusted program code via the window interface, a portion of the currently displayed webpage comprising purchase information, the purchase information being sufficient information for the Vendor to identify the Buyer's selected purchase; and transmitting from the local computer system, under the control of the Buyer operating via the trusted program code, an instruction to a Third Party different than the Vendor to pay the Vendor for the Buyer's purchase, wherein the instruction includes at least a pay portion of the purchase information obtained from the scanning and extracting on the local computer system the currently displayed webpage, the pay portion identifying at least a price and the Buyer's selected purchase, the instruction being sufficient information for the Third party to pay the Vendor for the Buyer's selected purchase.

2. The computer system of claim 1, configured to perform an act of transmitting directly to the Vendor by the local computer system of the Buyer under control of the trusted program code an order including at least an ordering portion of the purchase information, the ordering portion identifying at least the Buyer's selected purchase, and the order being sufficient information to purchase the Buyer's selected purchase from the Vendor.

3. The computer system of claim 1, configured to perform an act of transmitting under control of the trusted program code to the Third Party an order including at least an ordering portion of the purchase information.

4. The computer system of claim 3, wherein the ordering portion includes at least one of the price and a Vendor purchase reference.

5. The computer system of claim 1, wherein the trusted program code is provided by the Third Party to the local computer system.

6. The computer system of claim 1, wherein the browser is modified to enable operation of the trusted program code.

7. The computer system of claim 1, wherein the browser is modified to include a visual interface to interact with the trusted program code.

8. The computer system of claim 7, wherein the visual interface includes a portion in a title bar to interact with the trusted program code.

9. The computer system of claim 1, wherein the purchase information is tagged as purchase information in the currently displayed webpage and wherein extracting comprises an act of copying the purchase information to a payment window.

10. The computer system of claim 1, wherein the purchase information includes at least one of an account number of the Vendors Bank, the Vendor's invoice number and the Vendor's email address.

11. A method of enabling a Buyer to purchase a selection offered from a Vendor's website, the method comprising acts of:

providing a browser modified by program code, the browser having a window interface and trusted program code;

displaying via the browser on a display local to the Buyer a Vendor's webpage from a remote Host computer at a computer system that is local to the Buyer, the remote Host computer being remote from the local computer system and the Buyer;

browsing via the browser the Vendor's webpage;

selecting via the browser a purchase from the Vendor's webpage;

scanning on the local computer system the currently displayed Vendor's webpage;

automatically extracting a portion of the currently displayed webpage comprising purchase information from the currently displayed Vendor's webpage on the local computer system and storing the extracted purchase information from the currently displayed webpage on the local computer system under control of the trusted program code via the window interface, the purchase information being sufficient information for the Vendor to identify the Buyer's selected purchase; and transmitting from the local computer system, under the control of the Buyer operating via the trusted program code, an instruction to a Third Party different than the Vendor to pay the Vendor for the Buyer's purchase, wherein the instruction includes at least a pay portion of the purchase information obtained from the scanning and extracting on the local computer system the currently displayed webpage, the pay portion identifying at least a price and the Buyer's selected purchase, the instruction being sufficient information for the Third party to pay the Vendor for the Buyer's selected purchase.

12. The method of claim 11, comprising an act of transmitting directly to the Vendor by the local computer system of the Buyer under control of the trusted program code an order including at least an ordering portion of the purchase information, the ordering portion identifying at least the Buyer's selected purchase, and the order being sufficient information to purchase the Buyer's selected purchase from the Vendor.

13. The method of claim 11, comprising acts of:

transmitting under control of the trusted program code to the Third Party an order including at least an ordering portion of the purchase information, and transmitting by the Third Party the order to the Vendor, the ordering portion identifying the Buyer's selected purchase, and the order being sufficient information for the Buyer to purchase the Buyer's selected purchase from the Vendor.

14. The method of claim 13, wherein the ordering portion includes at least one of the price and a Vendor purchase reference.

15. The method of claim 13, comprising an act of reserving by the Vendor for the Buyer at least one of a good and service that corresponds to the Buyer's selected purchase.

16. The method of claim 11, comprising an act of installing in the local computer system the trusted program code from the Third Party to provide the modified browser of the local computer system.

17. The method of claim 11, comprising an act of modifying a browser program by the program code to provide the browser having the window interface and the trusted program code.

18. The method of claim 11, wherein the act of modifying the browser program comprises an act of modifying the browser program to include a visual interface to interact with the trusted program code.

19. The method of claim 11, wherein the purchase information is tagged as purchase information in the currently displayed webpage and wherein extracting comprises an act of copying the purchase information to a payment window.

20. The method of claim 11 wherein under control of the Buyer, the method comprising act of:

by the trusted program code
transmitting to the Third Party an instruction to pay the vendor, and
transmitting to the Vendor confirmation that the Third Party has been instructed to pay the Vendor.

21. The method of claim 20, wherein a single action by the Buyer initiates the acts of the transmitting the instruction to the Third Party to pay the vendor and the transmitting the confirmation to the Vendor that the Third Party has been instructed to pay the Vendor.

22. The method of claim 20, wherein in response to receiving confirmation that the Third Party has been instructed to pay the Vendor, the method comprising an act of reserving for the Buyer by the Vendor the selected purchase that is identified in the confirmation.

23. A computer system of a Third Party remote from a Buyer's computer system and comprising a memory configured with program code to control a processor to perform acts of:

receiving an instruction from the Buyer's computer system to arrange payment to a Vendor for a selection of a purchase, the instruction including purchase information automatically extracted from a displayed webpage on the Buyer's computer system under control of a trusted program code via a window interface, the trusted program code enabling the Buyer to browse the webpage of a remote Host computer of a Vendor's Website to render the webpage on a display local to the Buyer to enable selection of at least one of a good and service for purchase from the displayed webpage and to enable the automatic extraction of the purchase information from the displayed webpage; the purchase information being sufficient for the Vendor to identify the Buyer's selection of the purchase, the Vendor being a different party than the Third Party and the Vendor being remote from the Third Party;

verifying the Buyer;

verifying financial information associated with the Buyer to determine whether the Third Party will arrange payment to the Vendor;

in response to receiving the instruction, and the verifying of the Buyer and the verifying of the financial information, transmitting a confirmation of the receipt of the instruction to the Vendor; and initiating arranging for paying the Vendor for the purchases according to the purchase information included in the instruction.

24. The computer system of the Third Party of claim 23, wherein the confirmation includes the purchase information, and the Third Party's computer system transmits a message to the Buyer that the confirmation has been sent to the Vendor.

25. The computer system of the Third Party of claim 23, wherein the confirmation of the receipt of the instruction is transmitted to The Buyer's computer system.

26. A computer system of a Vendor remote from a Buyer and comprising a memory configured with program code to control a processor to perform acts of:

providing tagged information on a website to allow a Buyer's computer system to identify the purchase information, the purchase information being sufficient for the Vendor to identify a purchase of at least one of goods or services;

initiating a browsing session between the Vender's computer system and the Buyer's computer system, the browsing session allowing the Buyer to browse the Vendor's website to enable the Buyer to select purchases;

receiving a confirmation of receipt of an instruction from the Buyer to arrange for paying the Vendor for a selected purchase by the Buyer, the confirmation including at least purchase information automatically extracted from a displayed webpage on the Buyer's computer system under control of a trusted program code via a window interface, the trusted program code enabling the Buyer to browse the Vendor's Website to render the webpage on a display local to the Buyer to enable selection of at least one of a good and service for purchase from the displayed webpage and to enable the automatic extraction of the purchase information from the displayed webpage; the purchase information being sufficient for the Vendor to identify the Buyer and the selected purchase; and in response to receiving the confirmation, reserving the selected purchase for the Buyer.

27. The computer system of the Vendor of claim 26, wherein the Vendor's computer system receives from the Buyer the confirmation of the receipt of the instruction from the Buyer to the Third Party.

28. The computer system of the Vendor of claim 26, wherein the Vendor's computer system receives from the Third Party the confirmation of the receipt of the instruction from the Buyer to the Third Party.

* * * * *